R. B. BENJAMIN.
FISHING REEL.
APPLICATION FILED JAN. 2, 1914.
1,189,232.
Patented July 4, 1916.
3 SHEETS—SHEET 3.
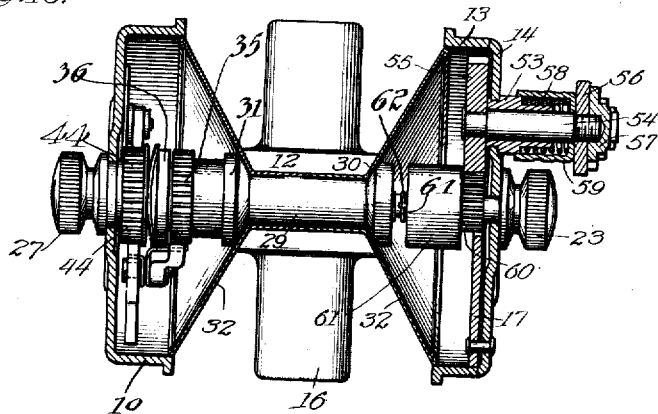
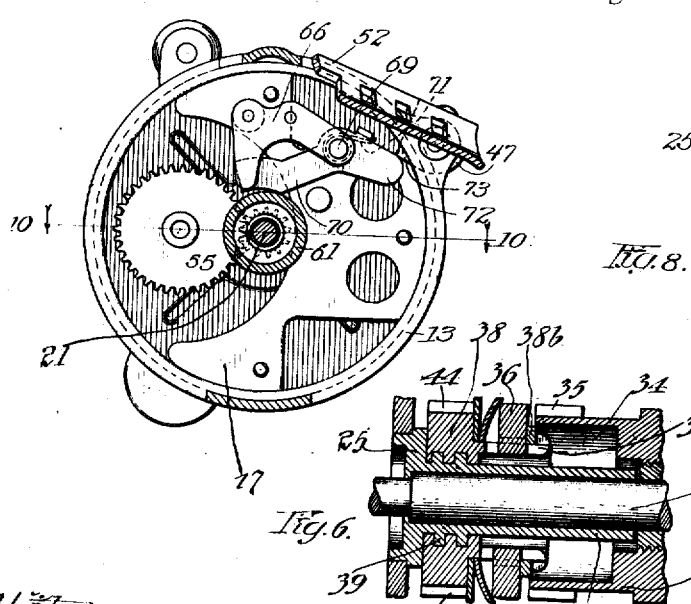
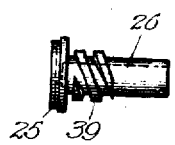
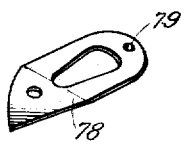
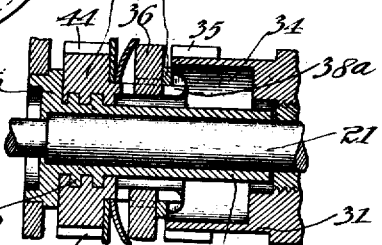
Witnesses:
Robert H. Weir
Charles G. Cope
Inventor
Reuben B. Benjamin
by Jones, Addington, Ames & Seibold
Attys.

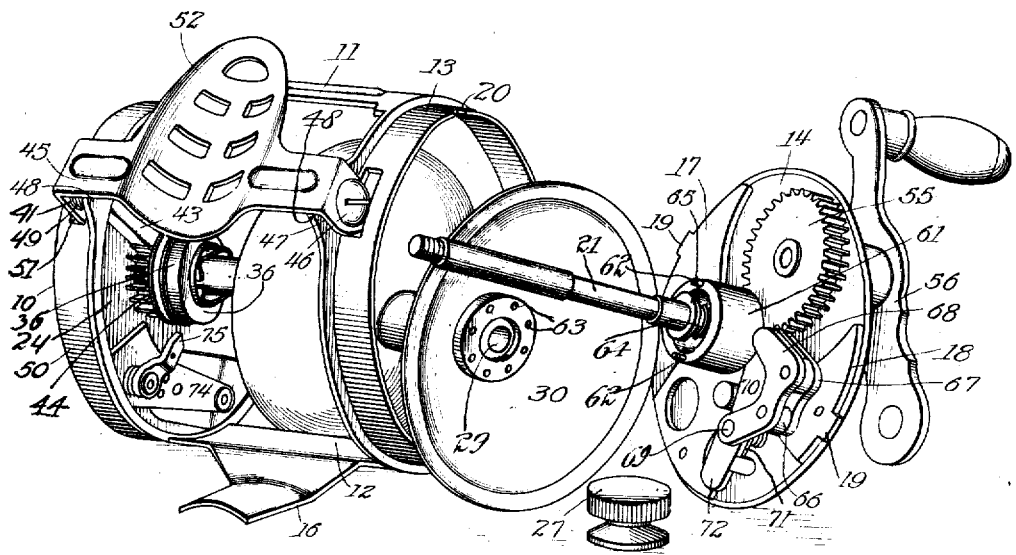

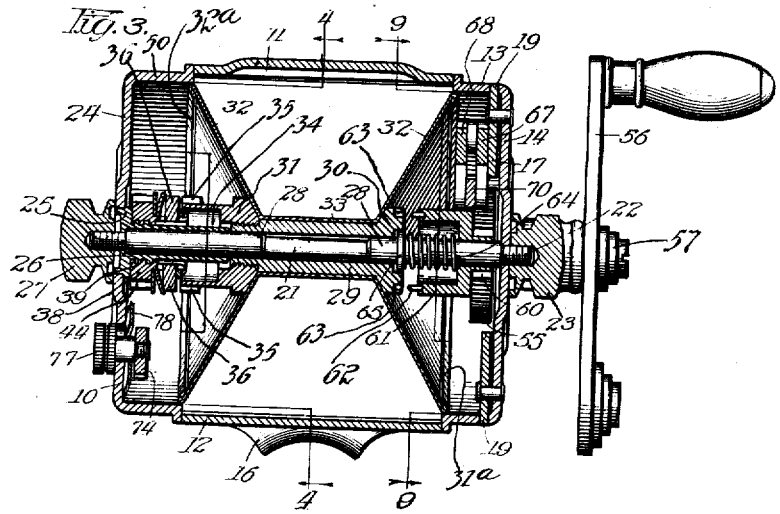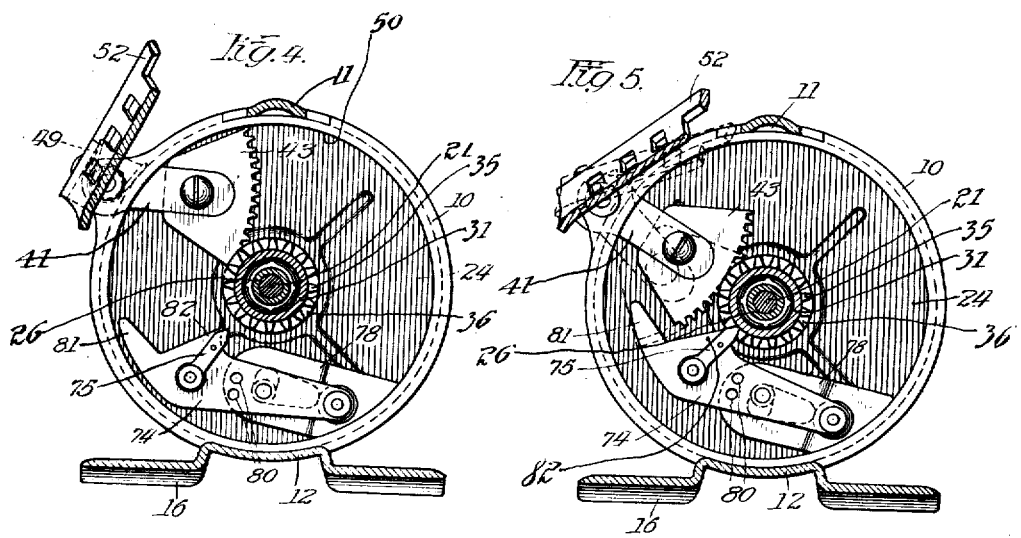

UNITED STATES PATENT OFFICE.

REUBEN B. BENJAMIN, OF CHICAGO, ILLINOIS, ASSIGNOR TO BENJAMIN-SELLAR MANUFACTURING COMPANY, OF CHICAGO, ILLINOIS, A CORPORATION OF ILLINOIS.

FISHING-REEL.

1,189,232.      Specification of Letters Patent.      Patented July 4, 1916.

Application filed January 2, 1914. Serial No. 809,995.

*To all whom it may concern:*

Be it known that I, REUBEN B. BENJAMIN, a citizen of the United States, residing at Chicago, in the county of Cook and State of Illinois, have invented new and useful Improvements in Fishing-Reels, of which the following is a full, clear, concise, and exact description, reference being had to the accompanying drawing, forming a part of this specification.

My invention relates to fishing reels, and especially pertains to "casting" reels, *i. e.* reels which are intended for use in the branch of fishing known as "bait casting". The reel ordinarily used in bait casting today includes a frame having a spool mounted to rotate very freely therein, such spool being driven, through a multiplying gear, by a crank handle. Sometimes a clutch is provided between the crank handle and the spool, to permit of the spool rotating independently of the crank handle during the casting of a bait. In the use of a reel of the type mentioned above, the line is wound up until the bait is within a few inches of the top of the rod. The spool is then held, by pressure of the ball of the thumb upon the line on the spool, the rod being swung back preparatory to casting out the bait. The bait is then thrown out, the thumb being removed from the spool to permit the bait to take line from the reel. While the bait is in the air, the rotation of the spool is controlled by a light pressure of the thumb thereon, this being known as the "thumbing" operation. When the bait has reached the desired point, the rotation of the spool is stopped by a firm pressure of the thumb. The line is then wound in ready for another cast.

The art of thumbing a reel properly can only be attained after long practice. This is largely due to the fact that the surface of the line on the spool is rough, and varies during the casting operation, making the greatest delicacy of manipulation by the thumb a necessity. Moreover, with a reel of the ordinary type, it is exceedingly difficult to make a far cast with a light bait, this being principally for the reason that it is difficult to give the light bait sufficient momentum to start the spool rotating properly without, at the same time, rendering a quick checking of the spool necessary, to prevent overrunning. Various mechanisms have from time to time been devised with a view to remedying these and other defects of the ordinary type of reel referred to above; but none of such mechanisms have, to my knowledge, been successful, or have attained any standing in the trade.

It is one of the principal objects of my invention to provide a fishing reel having a thumb-operated mechanical brake which will be an improvement on anything of the kind heretofore devised, and which will obviate many of the difficulties which have hitherto attended the casting operation.

It is a further object of my invention to provide a thumbing mechanism which, when released, will impart a slight preliminary rotating movement or tendency to the spool, thus lessening the amount of work which has to be done by the bait, in its initial movement, in starting the rotation of the spool.

It is a further object of my invention to provide a reel having a spool of minimum weight and constructed so that its inertia is as low as possible.

It is a further object of my invention to provide an improved clutch between the crank of the reel and the spool, which will permit of the crank being put into and out of operative relation with the spool with the greatest ease possible.

It is a further object of my invention to provide a reel having an automatic thumbing mechanism of such a nature as to place the reel in condition for casting before each cast, regardless of the condition of the several mechanisms of the reel prior to the cast. And it is a further object of my invention to provide a reel which will be of a simple and strong construction which can be taken apart readily for cleaning and oiling purposes, which will be efficient in use, and which may be placed on the market at a reasonable price.

Other and further objects of my invention will appear from the following specification.

One embodiment of my invention is described, by way of example, in the following specification; and is shown in the accompanying drawings. It is to be understood, however, that the form of reel described and shown is only one among those in which my invention may be embodied, and that changes may be made in the reel which is described and shown, without exceeding the scope of my invention, as defined in the appended claims.

In the drawings: Figure 1 is a perspective view of a reel constructed in accordance with my invention, showing the manner of using the same; Fig. 2 is a perspective view, on an enlarged scale, showing the reel with the principal members thereof taken apart; Fig. 3 is a vertical section taken through the reel with the parts in the positions which they assume with the brake off and the clutch connection between the spool and the crank disconnected; Fig. 4 is a vertical section taken on the broken line 4—4 of Fig. 3; Fig. 5 is a view similar to Fig. 4, but showing the position of the parts when the brake is partly on and when the click device is in operative position. The dotted lines in this figure indicate the position of the brake lever when the brake is in its full "on" position; Fig. 6 is an enlarged fragmentary sectional view showing the brake disk and the parts of the spool hub associated therewith; Fig. 7 is a detail view of the hollow bearing which carries the brake sleeve, the same being shown as it appears before it is secured to the reel head; Fig. 8 is a perspective view showing the slotted leaf spring which maintains the click plate in one or the other of its positions; Fig. 9 is a section on the line 9—9 of Fig. 3 looking in the direction of the arrows, the brake lever being shown, however, as being depressed to permit the clutch to be moved by its spring into the "out" position; and Fig. 10 is a horizontal section taken through the reel, the section being taken as on the line 10—10 of Fig. 9.

Like reference characters refer to like parts throughout the following specification and the several figures of the accompanying drawings.

The reel shown in the drawings comprises a frame having a fixed head plate and a removable head plate, in which head plates is mounted a fixed shaft. Upon this shaft is mounted, so as to be capable of free rotation, the spool of the reel, a clutch being provided between the spool and a crank handle with associated multiplying gears, carried by the removable head plate. This clutch is adapted to be thrown in by an endwise movement of the crank toward the reel frame, and to be thrown out by a spring device which is released, at the proper time, by a brake lever. At the opposite end of the reel, i. e. adjacent the fixed head plate, a movable brake member is provided. This member moves longitudinally toward the spool, and, during such movement, exercises a gradually increasing, braking effect on the spool. This braking effect is sufficient to hold the spool definitely against movement when the brake member has reached the end of its movement. The longitudinal movement of the braking member is effected by means of a brake lever which projects forwardly and upwardly from a bridge-plate which is pivoted to the two heads of the reel, the bridge-plate extending across the reel at a point somewhere above the rear side thereof. When the brake lever is pressed down, it effects, through the intermediary of a toothed segment, the longitudinal movement of the brake member above referred to. A return spring, with which the bridge-plate is provided, effects the return of the lever, and of the brake member, to its original position, when the brake lever is relieved from pressure. A click device is provided, which can be placed in or out of position by means of a movable knob extending through the reel head. This click device is constructed so as to be capable of holding the brake member impositively in a plurality of positions, so that any required braking retardation may be added to the retardation of the click device, as desired. The braking mechanism is so constructed that, when it is at the limit of its movement to put on the brake, it will automatically release the click device and effect the throwing out of the crank-clutch, so that, when the spool is being held stationary, by means of the brake, preparatory to making a cast, the click, if previously in its "on" position, will be thrown off, and the clutch will be thrown out, whereby the reel is put in the proper condition for casting.

Referring now to the drawings, the reel frame includes a rear head 10 of cup shape, which is connected, by means of an upper crossbar 11 and a lower crossbar 12 with the front head. The front head comprises a ring 13 and a disk shaped plate 14, which is removably connected to the ring 13. These parts are formed from suitably shaped sheet metal blanks by stamping, and are formed with ribs, such as 15 (Fig. 1) for giving extra strength where required. The lower crossbar 12 is provided with a transversely curved rod plate 16 for attachment to the reel seat of the rod in the ordinary manner.

Riveted to the inner side of the front plate 14 is a guide plate 17 (Fig. 2) portions 18 of which are adapted to engage within the periphery of the ring 13, so as to prevent lateral sliding of the front plate 14 with respect to the ring 13. The guide plate 17 is formed with two lugs or projections 19 disposed substantially diametrically opposite each other. These projections engage in corresponding recesses 20 formed in the edge of the ring 13, and serve to prevent rotary movement of the front plate 14 with respect to the ring.

The front plate 14 is removably secured to the frame by means of a fixed shaft 21 (Fig. 3), which passes through the reel from one end thereof to the other. This shaft is provided with a reduced and screw-threaded end 22, which passes through the center of the front plate 14 and receives a thumb nut 23. The thumb nut 23, being secured upon the threaded end 22, serves to secure the shaft 21 to the front plate, with the shoulder thereof, formed by reducing the end 22, in engagement with the inner side of the front plate. The rear wall 24 of the rear head 10 is formed with a large circular aperture at the center thereof, which aperture receives the flanged end 25 of a sleeve 26 (Figs. 3 and 7). The sleeve 26 is secured to the rear wall 24 by riveting out the flange 25 beyond the latter. The shaft 21 passes through the sleeve 26 and is threaded at its end to receive a thumb nut 27 similar to the thumb nut 23. When the thumb nut 27 is tightened it draws a shoulder on the shaft 21 against the inner end of the sleeve 26, thereby securing the shaft 21 to the rear head.

It will be seen that the frame of the reel can be taken apart in two ways. If the thumb nut 27 is removed, the head plate may be pulled away from the remainder of the frame, carrying with it the shaft 21, which latter will remain fixed to the head plate. If the thumb nut 23 is removed, the head plate may be taken off, leaving the shaft 21 connected to the rear head of the reel.

The shaft 21 is formed with two bearing collars 28 on which is rotatably mounted a spool-supporting sleeve 29. This sleeve is formed at one end with a fixed head 30, and at the other end is reduced and screw-threaded to receive a detachable head 31. The opposed sides of the heads 30 and 31 are made conical, so as to form, with the intermediate portion of the sleeve 29, a seat for the spool sections 32. These spool sections are duplicates of each other; and each consists of a conical side portion having a tubular center portion 33 springing therefrom. The spool portions are formed of thin aluminum, to give lightness to the spool, and the side portions are made to extend from the center portions at an angle of substantially 60 degrees, to facilitate proper spooling of the line. The outer edges of the side portion are flanged over at 32ª, so as to provide additional strength. The spool portions are mounted on the sleeve 29 with the ends of their center portions butting against each other. They are preferably cemented in place to prevent relative rotation between the spool and the sleeve 29. With the construction above described, it will be seen that the spool is capable of rotating freely upon the bearing collars 28 of the fixed shaft 21. The spool thus constructed is very light and strong and has low inertia.

The rear end of the spool sleeve 29 is situated in close proximity to the front end of the fixed sleeve 26, whereby free rotation of the spool is permitted, while substantial endwise movement of the spool is prevented. The head 31 of the spool sleeve is hollowed out, at 34, to receive the end of the fixed sleeve 26. The head 31 is enlarged at its end to form a toothed wheel 35 (Fig. 6), the rear face of which is adapted to be engaged by a brake disk 36, which disk is slidably but not rotatably mounted upon the tubular extension 38ª of a collar 38, carried by the sleeve 26. The washers, 37 and 37ª, are disposed between the brake disk 36 and the collar 38, one of which, the washer 37, is a spring washer, whereby the brake disk 36 is normally pressed outward against a retaining ring 38ᵇ carried by the front end of the collar-extension 38ª. The collar 38 is formed with an interior double thread which coöperates with a corresponding thread 39 formed on the fixed sleeve 26, at the rear end thereof.

It will be seen, therefore, that rotation of the collar 38 in one direction or the other will have the effect of moving the collar, and consequently the disk 36, toward or away from the spool. When the collar 38 is rotated so as to move toward the spool, it will first move the disk 36 into engagement with the face of the toothed wheel 35, and afterward will compress the spring washer 37 to a greater and greater extent, thereby causing the disk 36 to exert a gradually increasing braking pressure upon the spool.

The rotating movement of the collar 38 is effected by means of a toothed segment 43, the teeth of which mesh with corresponding teeth 44, which are formed upon the collar 38. The toothed segment 43 is secured to an arm 41 (Fig. 4) which projects forwardly from a bridge plate 45, which extends across the reel and is pivoted to the heads thereof. When this bridge plate is rocked about its pivots, it causes the segment 43 to swing downward, and thereby effect a rotating movement of the collar 38. The bridge plate is pivoted to the heads of the reel by means of screws 46, one of which passes through the arm 41 at one end of the bridge plate, and the other of which passes through a lug 47 at the other end of the bridge plate, the screws entering internally threaded rivets which are mounted in ears 48 formed upon the front and rear heads of the reel. A coil spring 49 is disposed on the screw 46, between the arm 41 and the adjacent ear 48, one end of the spring engaging the bridge plate, and the other end engaging a flange 50 which extends forward from the wall 24 of the rear head. The tendency of this spring is to hold the bridge plate in the position in which the top part of the segment 43 engages the inner side of the flange 50, i. e. the position in which the brake is "off" (Figs. 3 and 4). A slot 51 is formed in the flange 50 of the rear head to permit the passage of the arm 41 therethrough. Projecting upwardly and forwardly from the bridge plate 45, is the brake lever, taking the form of a conveniently shaped thumb piece 52 formed integrally with the bridge plate 45. It will be seen that when pressure is exerted upon the thumb piece 52, the bridge plate 45 will be rocked about its pivots, the segment 43 descending to an extent depending on the distance through which the bridge plate has been rocked, and applying the brake to a corresponding extent. When the thumb piece 52 is pressed down to the utmost limit, the brake disk 36 will be pressed against the spool to such an extent as to hold the latter definitely against movement. When pressure is removed from the thumb piece 52, the bridge plate returns to the position shown in Fig. 4, under the action of the spring 49, the brake being thereby entirely removed.

The driving mechanism and clutch are constructed as follows: The front plate 14 is provided, at one side of the center thereof, with a hollow bushing 53, through which passes the crank spindle 54, carrying, at its inner end, the driving gear 55, and, at its outer end, the crank 56. The outer end of the spindle 54 is reduced and screw threaded, the crank being screwed thereon so as to abut against the shoulder formed by the reducing of the end of the spindle. A lock nut 57 is provided for securing the crank 56 in position. The spindle 54 is made longer than the hollow bushing 53, so as to be capable of endwise movement therein; and a coil spring 58 is placed between the crank and a shoulder formed on the bushing 53, this spring tending to hold the spindle in the position in which the gear 55 is close against the inner side of the front plate 14. A sliding cap 59 is provided for hiding and protecting the spring 58.

A pinion 60, meshing with the gear 55, is mounted slidably and rotatably on the fixed shaft 21. The pinion 60 is provided, at its rear side, with an annular clutch member 61 of greater diameter than the pinion. On this member 61 are arranged a pair of diametrically disposed pins 62 adapted to enter any corresponding pair of a plurality of equally spaced holes 63 formed in the front side of the head 30 of the spool sleeve 29. The front side of the clutch member 61 is engaged by the rear face of the driving gear 55, so that when the driving gear is moved inward, the clutch member is moved, against the action of a spring 64, toward the head 30, to permit the pins 62 to engage in the holes 63.

The spring 64 engages, at one end, against a collar 65 formed on the shaft 21, and, at the other end against the clutch member 61.

A latch supporting frame 66 (Figs. 2 and 9) is secured to the guide plate 17 and consists of an inner plate 67 and an outer plate 68 secured together in spaced relation with each other. The outer plate 68 is provided with an extension at its rear end, which extension has projecting therefrom a pin 69. Upon this pin is pivoted a latch 70 which is adapted to be pressed toward the clutch member 61 by means of a spring 71 with which it is provided. When the clutch is in its "off" position, the latch 70 bears upon the outer surface of the clutch member 61. When, however, the clutch member is moved toward the head 30, to throw in the clutch, the latch snaps down behind the end of the clutch member 61, and thereby prevents the clutch member from returning under the action of the spring 64. The latch 70 lies between the front ends of the inner frame plate 67 and the outer frame plate 68, whereby lateral play of the latch is prevented. When it is desired to throw in the clutch, the crank 56 is pushed toward the frame of the reel, the result being that the gear wheel 55 pushes the clutch member 61 into operative relation with the head 30. When this is done, the latch 70, which was previously resting on the outer periphery of the clutch member 61, as shown in Fig. 3, will be forced, by the spring 71, down into a position behind the end of the clutch member 61. In this position, the latch will prevent the clutch member 61 from moving back, until the latch is released in the manner to be described below. The crank handle can, however, return to its original position, leaving the clutch member in its connected position.

The latch 70 is provided with a heel 72; and the location of the parts is such that this heel is disposed adjacent the inner end of the lug 47 at the front end of the bridge plate 45 (Fig. 9). The lower edge of the lug 47 forms a cam which engages the heel 72, and is extended so as to create a cam projection 73 at the part thereof which will engage the heel 72 when the thumb piece is depressed to the utmost limit. When the cam projection comes into engagement with the heel 72 of the latch, it depresses the same, and consequently lifts the front end of the latch out of engagement with the end surface of the clutch member 61, thus enabling the member 61 to move back, under the action of the spring 64, into the position in which the clutch is out. The depressing of the thumb piece 52, therefore, to the full extent has the effect of throwing out the clutch.

The reel is provided with a click device, which is constructed as follows: A click plate 74 is pivotally mounted on a rivet secured to the end wall 24 of the rear head (Figs. 4 and 5), and carries a spring pressed dog 75 mounted so as to be capable of movement in either direction about its pivot, being subsequently returned to its normal position by the spring. When the click is on, this dog coöperates with the teeth of the toothed wheel 35, which latter is carried by the spool, as described above, thereby giving the ordinary clicking drag effect. The click plate is provided with a stud which projects rearwardly through a slot in the rear wall 24 and terminates in a knob 77 by means of which the click plate 74 can be moved about its pivot into and out of operative relation with the toothed wheel 35. Located between the click plate 74 and the end wall 24 is a leaf spring 78 having a slot therethrough to permit the required movement of the click-operating stud. The leaf spring 78 presses firmly against the rear side of the click plate 74, and is formed with a hump or projection 79, which is adapted to enter one or the other of two holes 80 formed in the click plate 74, according to the position of the click plate. The leaf spring 78 thus impositively holds the click plate in each of its two positions. The click plate 74 is formed with a heel 81 situated in the path of the brake operating segment 43, so as to be engaged by the latter when the thumb piece 52 is pressed downward to the utmost extent. When the thumb piece, carrying with it the segment 43, approaches the limit of its downward movement, the segment 43 strikes the heel 81 and forces the click plate into the position in which the dog 75 is out of operative relation with the toothed wheel 35. It will be seen, therefore, that the effect of pressing the thumb piece downward to the end of its movement is to release the click.

The click plate 74 is formed with an inwardly extending spur 82 which is adapted, when the click plate is in its operative position, to engage the teeth 44 of the brake-collar 38 (Fig. 5). The purpose of this spur is to hold the brake segment 43 in any position to which it may be moved by means of the thumb piece 52, instead of permitting the segment to return to its original position, under the action of the spring 49, as it would do ordinarily. When the click plate is in its operative position (Fig. 5), the segment 43 may be depressed to any desired extent, the click plate springing aside somewhat as each of the teeth 44 moves past the spur 82. The brake may thus be set to any desired braking pressure, and will be held in that position by the spur 82. It is thus possible to augment the dragging effect of the click device with any desired braking pressure.

In the use of my reel, the bait is first wound up to within a few inches of the top of the rod. The rod is then grasped firmly with the thumb pressed forcibly on the thumb-piece 52, such pressure having the effect of moving the brake member 38 into the position in which the brake disk 36 holds the spool against movement, and the further effect of throwing out the clutch and throwing off the click device, if the latter had been previously in use. The cast is now made; and, as the bait is thrown out, the thumb is lifted from the thumb piece 52, the position of the thumb piece permitting this to be done without loosening of the grasp upon the handle of the rod and thus rendering the wielding of the rod inaccurate. As the bait takes line from the reel, the thumb presses upon the thumb piece 52 and exercises a delicate braking pressure on the spool to prevent overrunning of the spool. By the proper manipulation of the thumb piece 52, a more delicate "thumbing" of the spool can be effected than would be possible by the use of the thumb itself directly upon the line on the spool; and proficiency in manipulating the thumb piece is not difficult to attain. When the bait has reached the desired point, the thumb piece is pressed forcibly, which causes the spool to be stopped, thus, of course, causing the bait to drop into the water. The thumb is then released from the thumb piece 52, and the handle of the reel crank 66 seized. As the handle of the reel crank is seized, it is given a slight push toward the frame, the effect of which is that the clutch is thrown in, and the spool, which was previously free from the crank, made to turn therewith. If a fish is hooked during the recovery of the bait by the turning of the crank, it may be played to a certain extent by the manipulation of the thumb piece to give the desired resistance to the taking of line by the fish. If the fish is powerful, or if otherwise desired, the click device may be put into operation by manipulating the knob 77. When the bait has been recovered, or the fish landed, the click device and the clutch are automatically thrown out of action by the pressure of the thumb on the thumb piece preparatory to making a new cast.

It will be noted, that as the segment 43 springs upward, under the action of the spring 49, when the thumb is lifted from the thumb piece 52, during the making of a cast, the brake-collar 38 rotates in the same direction as the spool will rotate when the cast is made. As the brake-disk 36 was in firm engagement with the spool before the thumb piece was released, it will be seen that the disk will impart a slight rotating movement or tendency to the spool just at the moment when the disk leaves the head 31. This renders more easy the making of a far cast with a light bait, since it obviates the necessity of the bait doing the entire work of starting the rotation of the spool; and this is especially so owing to the lightness and low inertia of the spool.

The reel described above is very efficient and convenient in use; and it considerably lessens the difficulty of acquiring proficiency in the art of casting bait. The parts employed are relatively few and are of strong construction, so that the reel is not liable to get out of order, under conditions of hard use. The reel can be taken apart for cleaning or oiling with the greatest ease; and the light and freely rotating spool makes it possible to effect long casts, and to place the bait accurately. The construction is such that the greater number of parts may be made from stamped metal, whereby the cost of production of the reel is lessened and the placing of it on the market, at a reasonable cost, is rendered possible. It will be observed also, that the spool is never absolutely locked to the shaft; so that it would rotate upon the shaft in case of the occurrence of a strain too heavy for the safety of the rod or line.

While I have described and shown one construction of reel in which my invention is embodied, it is to be understood that the invention may take other forms, and that some of the mechanisms described may be employed in connection with other reels than those intended for use in bait casting, and further that changes may be made in the mechanisms which I have described and shown without exceeding the scope of my invention, what I claim being:

1. In a fishing reel the combination with a line spool, of a variable brake adapted to retain said spool against movement when fully applied, said brake being disposed and arranged so as to impart a rotating movement to said spool when released.

2. In a fishing reel the combination with a line spool, of a spring returned spool retaining member, and means for simultaneously moving said member in the direction of its axis toward said spool and rotating said member, whereby said member when released imparts a rotating movement to said spool when released.

3. In a fishing reel the combination with a line spool, of a spring returned brake member, and means for moving said brake member gradually toward said spool to exert a gradually increasing braking pressure thereon, and for simultaneously rotating said brake member, whereby said brake member when released imparts a rotating movement to said spool when released.

4. In a fishing reel the combination with a line spool, of a releasable member for retaining said spool against movement, said member being disposed and arranged so as to impart a rotating movement to said spool when released, and a thumb operated member for releasing said first named member.

5. In a fishing reel the combination with a line spool, of a braking member for said spool, and a thumb operated device for moving said braking member toward said spool, thereby to cause a gradually increasing braking effect upon said spool, said braking member being disposed and arranged so as to cause a rotating movement to said spool when released.

6. In a fishing reel the combination with a line spool, of a braking member for said spool, and a thumb operated device for gradually moving said braking member toward said spool and simultaneously rotating said member, whereby a gradually increasing braking effect upon said spool is produced, and said braking member is caused to impart a rotating movement to said spool when relesaed.

7. In a fishing reel the combination with a manually operable variable brake, of a click mechanism, and means for placing said click mechanism in inoperative position when said brake reaches the limit of its braking movement.

8. In a fishing reel the combination with a variable brake, and a thumb lever for actuating said brake, of a click mechanism, and means for placing said click mechanism in inoperative position when said brake has reached the limit of its braking movement.

9. In a fishing reel the combination with a manually operable variable braking device having an abutment, of a click member movable into and out of operative position, said member having a portion adapted for engagement by said abutment when said braking device reaches the limit of its braking movement, whereby said click member is then moved out of operative position.

10. In a fishing reel the combination with a variable brake, and a manually operable member for actuating said brake, of a click member movable into and out of operative position, said click member having a portion adapted for engagement by said brake-actuating member when said brake reaches the limit of its braking movement, whereby said click member is then moved out of operative position.

11. In a fishing reel the combination with a rotatable member adapted, when rotated, to exercise a gradually increasing braking effect, and a manually operable segment for rotating said member, of a click member movable into and out of operative position, said click member having a portion adapted for engagement by said segment when said rotatable member reaches the limit of its braking movement, whereby said click member is then moved out of operative position.

12. In a fishing reel the combination with a manually operable variable braking device having an abutment, of a pivoted click plate adapted to be rocked into and out of operative position, said click plate having a portion adapted for engagement by said abutment when said braking device reaches the limit of its braking movement, whereby said click plate is then moved out of operative position.

13. In a fishing reel including a reel head, the combination with a manually operable variable braking device having an abutment, of a click member movable into and out of operative position and having a knob extending through said reel head for permitting manual operation of said member, said click member having a portion adapted for engagement by said abutment when said braking device reaches the limit of its braking movement, whereby said click member is then moved out of operative position.

14. In a fishing reel including a reel head, the combination with a rotatable member adapted when rotated to exercise a gradually increasing braking effect, and a manually operable segment for actuating said rotatable member, of a pivoted click plate movable into and out of operative position, said click plate having a knob extending through said reel head for permitting manual operation of said plate, and said click plate having a portion adapted for engagement by said segment when said rotatable member reaches the limit of its braking movement, whereby said click plate is then moved out of operative position.

15. In a fishing reel including a spool, the combination with a manually operable variable braking device, of a crank for actuating said spool, a clutch between said crank and said spool, and means, actuated by said device when the latter reaches the limit of its braking movement, for releasing said clutch.

16. In a fishing reel including a spool, the combination with a variable brake, and a thumb operated device for actuating said brake, of a crank for actuating said spool, a clutch between said spool and crank, and means, actuated by said device when said brake reaches the limit of its braking movement, for releasing said clutch.

17. In a fishing reel including a spool, the combination with a variable brake, and a thumb operated device for actuating said brake and having an abutment, of a crank for actuating said spool, a clutch between said crank and said spool, a releasable retaining member for said clutch, said member having a portion adapted for engagement by said abutment when said brake reaches the limit of its braking movement, whereby said clutch is then released.

18. A fishing reel comprising a spool, a crank for actuating said spool, a clutch between said crank and said spool, and a manually operable brake arranged, when operated, also to cause the operation of said clutch.

19. A fishing reel comprising a spool, a crank for operating said spool, a clutch between said crank and said spool, and manually operable means for retaining said spool against movement, said retaining means being arranged, when operated, to release said clutch.

20. A fishing reel comprising two reel heads, a spool between said heads, a crank carried by one of said heads for actuating said spool, a clutch between said crank and said spool, a spool retaining device associated with the other reel head, and a member mounted between said reel heads for causing the actuation of said retaining device and said clutch.

21. A fishing reel comprising two reel heads, a spool between said heads, a crank carried by one of said heads for actuating said spool, a clutch between said crank and said spool, a variable brake associated with the other reel head, and a manually operable member mounted between said reel heads, and connected with said brake so as to actuate the same, and with said clutch so as to release the same when said brake reaches the limit of its braking movement.

22. A fishing reel comprising two reel heads, a spool between said heads, a crank carried by one of said heads for actuating said spool, a clutch between said crank and said spool, a releasable retaining device for said clutch, said device having an abutment, a variable brake associated with the other reel head, and a manually operable member mounted between said reel heads for actuating said brake, said brake having a portion adapted to engage said abutment when said brake reaches the limit of its braking movement, whereby said retaining device is then released.

23. A fishing reel comprising a spool, a releasable click device associated with said spool, a crank for actuating said spool, a clutch between said crank and said spool, and a manually operable spool retaining device arranged, when operated, to release said click device and said clutch.

24. A fishing reel comprising a spool, a releasable click device associated with said spool, a crank for operating said spool, a clutch between said crank and said spool, and a manually operable variable brake device arranged to release said click device and said clutch when it reaches the limit of its braking movement.

25. A fishing reel comprising two reel heads, a spool between said reel heads, a releasable click device associated with one of said reel heads and coöperating with said spool, a crank associated with the other reel head for actuating said spool, a clutch between said crank and said spool, a spool retaining device, a manually operable member rockably mounted between said heads for operating said retaining device, and means, associated with said manually operable member, for releasing said click device and said clutch when said retaining device is operated.

26. A fishing reel comprising two reel heads, a spool between said heads, a releasable click device associated with one of said heads and coöperating with said spool, a crank associated with the other head for actuating said spool, a clutch between said crank and said spool, a variable braking device arranged to release said click device when said braking device reaches the limit of its braking movement, and a manually operable member mounted between said reel heads for actuating said braking device and releasing said clutch when said braking device reaches the limit of its braking movement.

27. A fishing reel comprising two reel heads, a spool between said heads, a releasable click device associated with one of said heads and coöperating with said spool, a crank associated with the other head for actuating said spool, a clutch between said crank and said spool, a releasable retaining member for said clutch, said retaining member having an abutment, a variable braking device arranged to release said click device when said braking device reaches the limit of its braking movement, and a manually operable member mounted between said reel heads for actuating said braking device, said last named member having a portion arranged to engage said abutment when said braking device reaches the limit of its braking movement, whereby said retaining member is then released.

28. In a fishing reel, the combination with a spool, of a rotatable friction brake therefor, thumbing mechanism to apply said brake to the spool, a spring to return said mechanism to nórmal position when the pressure of the thumb is removed, said spring when relieved serving to start the spool rotating through the medium of said brake.

29. A fishing reel comprising a shaft, a spool rotatably mounted on said shaft and having a clutch portion, a clutch member slidably mounted on said shaft to coöperate with said clutch portion, a crank for rotating said clutch member and including a longitudinally movable stem having engaging relation with said clutch portion, whereby said clutch portion is thrown into operative position when said stem is moved longitudinally.

30. A fishing reel comprising a shaft, a spool rotatably mounted on said shaft, and having a clutch portion and clutch member slidably mounted on said shaft to coöperate with said clutch portion, said clutch member having a gear and a shoulder, a crank including a longitudinally movable stem and a gear carried by said stem meshing with said first named gear and engaging said shoulder.

31. A fishing reel comprising a shaft, a spool rotatably mounted in said shaft and having a clutch portion, a clutch member slidably mounted on said shaft and coöperating with said clutch portion, a crank for rotating said clutch member and having a longitudinally movable stem, said stem having engaging relation with said clutch member, whereby said clutch member is moved into operative position when said stem is moved longitudinally, and a manually releasable retaining device for said clutch member.

32. A fishing reel comprising a shaft, a spool rotatably mounted on said shaft and having a clutch portion, a clutch member slidably mounted on said shaft and coöperating with said clutch portion, said clutch member having a gear and a shoulder, a crank having a longitudinally movable stem, a gear carried by said stem meshing with said first named gear and engaging said shoulder, and a manually operable retaining device for said clutch member.

33. A fishing reel comprising a shaft, a spool rotatably mounted on said shaft and having a clutch portion, a clutch member slidably mounted on said shaft and coöperating with said clutch portion, said clutch member having a gear and a shoulder, a crank having a longitudinally movable stem, a gear carried by said stem meshing with said first named gear and engaging said shoulder, a retaining member arranged to engage said clutch member when the latter is moved into operative position, and manually operable means for releasing said retaining member.

34. In a fishing reel the combination with a rotatable braking device adapted, when rotated, to exercise a gradually increasing braking effect, said device including a gear and manually operable means for rotating said device, of a removable detent coöperating with said gear for retaining said braking device in any one of a plurality of braking positions.

35. In a fishing reel including a spool, the combination with a manually operable device for exercising a gradually increasing braking effect upon said spool, of a releasable click device coöperating with said spool and adapted to retain said braking device in any one of a plurality of braking positions.

36. In a fishing reel including a spool, the combination with a manually operable device for exercising a gradually increasing braking effect upon said spool, said device including an abutment, of a removable click device coöperating with said spool and arranged to retain said braking device in any one of a plurality of positions, said click device having a portion adapted for engagement by said abutment when said braking device reaches the limit of its braking movement, whereby said click device is then removed.

37. In a fishing reel the combination with a rotatable braking member adapted, when rotated, to exercise a gradually increasing braking effect, said member including a gear and manually operable means for actuating said braking member, of a pivoted click plate having a dog coöperating with said gear, thereby to retain said brake member in any one of a plurality of positions, and said click plate having a portion adapted for engagement by said actuating means when said brake member reaches the limit of its braking movement, whereby said click plate is then released.

38. In a fishing reel, the combination with a spool, of a longitudinally moving braking member carried by the frame, said member being adapted to move longitudinally when rotated, a pinion carried thereby, a segmental gear engaging said pinion and operated by a thumbing mechanism for controlling the application of said brake, a locking pawl carried by the frame and adapted to engage in the teeth of said pinion to lock said brake at any desired degree of application.

39. In a fishing reel, the combination with a spool, of a friction brake therefor, thumbing mechanism to apply said brake to the spool, a spring to return said mechanism to normal position when the pressure of the thumb is removed, said spring when relieved serving to start the spool rotating through the medium of said brake.

In witness whereof, I have hereunto subscribed my name in the presence of two witnesses.

REUBEN B. BENJAMIN.

Witnesses:
E. R. KING,
CHARLES G. COPE.

36. In a fishing reel including a spool, the combination with a manually operable device for exercising a gradually increasing braking effect upon said spool, said device including an abutment, of a removable click device coöperating with said spool and arranged to retain said braking device in any one of a plurality of positions, said click device having a portion adapted for engagement by said abutment when said braking device reaches the limit of its braking movement, whereby said click device is then removed.

37. In a fishing reel the combination with a rotatable braking member adapted, when rotated, to exercise a gradually increasing braking effect, said member including a gear and manually operable means for actuating said braking member, of a pivoted click plate having a dog coöperating with said gear, thereby to retain said brake member in any one of a plurality of positions, and said click plate having a portion adapted for engagement by said actuating means when said brake member reaches the limit of its braking movement, whereby said click plate is then released.

38. In a fishing reel, the combination with a spool, of a longitudinally moving braking member carried by the frame, said member being adapted to move longitudinally when rotated, a pinion carried thereby, a segmental gear engaging said pinion and operated by a thumbing mechanism for controlling the application of said brake, a locking pawl carried by the frame and adapted to engage in the teeth of said pinion to lock said brake at any desired degree of application.

39. In a fishing reel, the combination with a spool, of a friction brake therefor, thumbing mechanism to apply said brake to the spool, a spring to return said mechanism to normal position when the pressure of the thumb is removed, said spring when relieved serving to start the spool rotating through the medium of said brake.

In witness whereof, I have hereunto subscribed my name in the presence of two witnesses.

REUBEN B. BENJAMIN.

Witnesses:
E. R. KING,
CHARLES G. COPE.

---

Corrections in Letters Patent No. 1,189,232.

It is hereby certified that in Letters Patent No. 1,189,232, granted July 4, 1916, upon the application of Reuben B. Benjamin, of Chicago, Illinois, for an improvement in "Fishing-Reels," errors appear in the printed specification requiring correction as follows: Page 3, line 78, for the word "The" read *Two;* page 8, line 76, claim 31, for the word "in" read *on;* and that the said Letters Patent should be read with these corrections therein that the same may conform to the record of the case in the Patent Office.

Signed and sealed this 22d day of August, A. D., 1916.

[SEAL.]

F. W. H. CLAY,
*Acting Commissioner of Patents.*

Cl. 242—84.5.

It is hereby certified that in Letters Patent No. 1,189,232, granted July 4, 1916, upon the application of Reuben B. Benjamin, of Chicago, Illinois, for an improvement in "Fishing-Reels," errors appear in the printed specification requiring correction as follows: Page 3, line 78, for the word "The" read *Two;* page 8, line 76, claim 31, for the word "in" read *on;* and that the said Letters Patent should be read with these corrections therein that the same may conform to the record of the case in the Patent Office.

Signed and sealed this 22d day of August, A. D., 1916.

[SEAL.]

F. W. H. CLAY,

*Acting Commissioner of Patents.*

Cl. 242—84.5.